J. T. RONALD.
WHEEL RIM.
APPLICATION FILED OCT. 13, 1915.
1,203,134.
Patented Oct. 31, 1916.
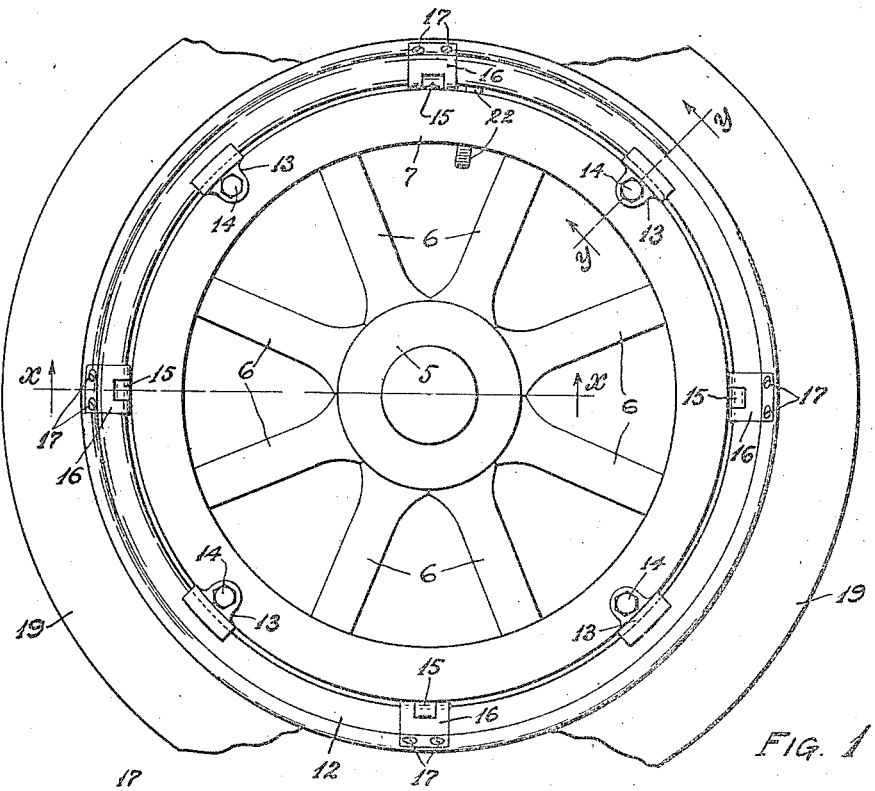
FIG. 1
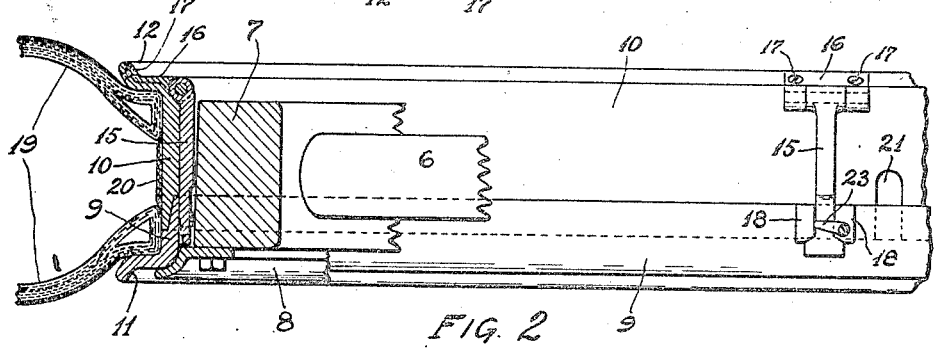
FIG. 2
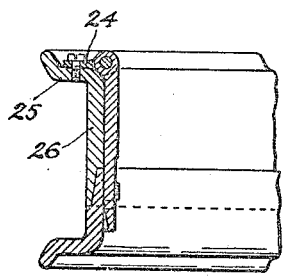
FIG. 4.
FIG. 3
WITNESSES:
O. Johnson
Frank Warren
INVENTOR
James T. Ronald
BY
C. D. Haskins
ATTORNEY

UNITED STATES PATENT OFFICE.

JAMES T. RONALD, OF SEATTLE, WASHINGTON.

WHEEL-RIM.

1,203,134.  Specification of Letters Patent.  Patented Oct. 31, 1916.

Application filed October 13, 1915. Serial No. 55,603.

*To all whom it may concern:*

Be it known that I, JAMES T. RONALD, citizen of the United States, residing at Seattle, in the county of King and State of Washington, have invented a certain new and useful Improvement in Wheel-Rims, of which the following is a specification.

My invention relates to improvements in metal wheel-rims which are adapted to be removably mounted upon the spoke-supported fellies of wheels of vehicles as of wheels of automobiles, and upon which wheel-rims may be removably mounted pneumatic tires of a common form, and the object of my invention is to provide a wheel-rim upon which may be removably mounted, quickly and easily, a pneumatic tire and which wheel-rim, itself, may be readily and removably mounted upon the spoke-supported felly of a wheel, whereby, when it becomes necessary to remove a tire to repair it or to replace it with a new one, then such wheel-rim may be quickly and easily removed from its position on the felly of the wheel and the pneumatic tire then readily removed from said wheel-rim, whereupon such pneumatic tire, after being repaired, or a new tire of like form, may be quickly and properly disposed and fastened on said wheel-rim and said wheel-rim then replaced and fastened on the felly of said wheel. I accomplish this object by devices illustrated in the accompanying drawings wherein—

Figure 1 is a view in front elevation of an automobile wheel upon which is mounted a wheel-rim embodying my invention together with a pneumatic tire mounted on said wheel-rim; Fig. 2 is an enlarged view of the same in radial section on line $x$, $x$ of Fig. 1, the hub portion of said wheel being broken away; Fig. 3 is an enlarged view in radial section on broken line $y$, $y$ of Fig. 1, showing details of my invention; and Fig. 4 is an enlarged view in radial section of a portion of a wheel-rim embodying my invention showing a modified form of details thereof.

Referring to the drawings, throughout which like reference numerals indicate like parts, 5 designates the hub of a wheel from which hub 5 extends radially a plurality of spokes 6 upon the outer ends of which is securely mounted a concentrically disposed felly portion 7.

Upon the rear side surface of the felly portion 7, in a position concentric therewith, is fastened an annular flange 8 of a larger external diameter than the diameter of the periphery of the felly portion 7, the position of which annular flange 8 and its cross-sectional shape is clearly indicated in Fig. 2.

Disposed to encircle the felly portion 7 is a metal wheel-rim comprising two separable bands 9 and 10 which are provided each with an integral flange on its outer edge portion, as flanges 11 and 12 respectively, and whose inner edge portions are joined by a separable telescopic joint, as shown in Fig. 2, thus to form a channeled band around said felly portion 7, one side portion of which channel band engages with and is supported by the annular flange 8, while the other side portion thereof engages with and is supported by a plurality of clamps 13 which are fastened to the front side surface of the felly portion 7 at equi-distant circumferential points thereof by means of bolts 14, the cross-sectional shape and the position of each of said clamps 13 with respect to the band 10, the flange 12 and the felly portion 7 being more clearly illustrated in Fig. 3.

When the two separable bands 9 and 10 of the wheel-rim are thus disposed and fastened on the felly portion 7 the flanges 11 and 12 of said bands 9 and 10 respectively, serve to maintain the telescopic joint between said bands 9 and 10; and the integrity of such telescopic joint is further secured by means of locking bars 15 one end of each of which is pivotally hinged to a different pair of integrally connected lugs 16 which are inlaid within the front side edge of the band 10 and the flange 12 thereof, said pairs of lugs 16 being disposed at equi-distant points and there fastened by screws 17, each of said locking bars 15 being disposed to extend from its lugs 16 directly across the band 10 to lie between and project beyond two lugs which are integral with the band 9, and that portion of it which so projects beyond said lugs 18 is of such greater width as will adapt it to make a locking engagement with the outer end surfaces of said two lugs 18, as shown in Fig. 2, thus to lock together the bands 9 and 10, which with their flanges 11 and 12, respectively, form the wheel-rim upon which is mounted a pneumatic tire, of a form well known, the outer casing 19 of which only is shown.

A portion of the peripheral surface of the band 10 is covered with a strip 20 of canvas or other soft material whereby the inner elastic air tube (not shown) may be protected from direct contact with the metal surface of said band 10 when such air tube is inflated in its normal position within said outer casing 19.

The band 10 is provided with a slot 21 which extends from its inner edge past the telescopic joint and beyond the center of the distance between the flanges 11 and 12 to form an opening through which may extend a nipple 22 that connects with the inner elastic air tube, not shown.

In order to remove this wheel-rim from the felly portion 7, the bolts 14 are unscrewed for a sufficient distance to permit the clamps 13 to disengage from the band 10 and the flange 12 thereof, whereupon such clamps 13 may turn on the bolts 14 to a position that will permit the wheel-rim freely to be withdrawn from the felly portion 7; and then to remove the pneumatic tire from said wheel-rim the locking bars 15 are swung on their pivots to disengage their outer ends from the lugs 18 whereupon the band 9 will readily separate from the band 10, at the telescopic joint that unites them, with the result that the outer casing 19 of the tire, with its inclosed elastic inner tube, will be released to permit it readily to be removed from the band 10.

When a pneumatic tire is to be replaced on the wheel-rim, the bands 9 and 10 being separated, the outer casing 19 with its inner tube inclosed therein is placed on the band 10, the nipple 22 being disposed in the slot 21, and thereupon the band 9 is telescopically joined to the band 10, and the locking bars 15 swung into their positions between the respective ones of the lugs 18 securely to lock said bands 9 and 10 together; and to retain said locking bars 15 in their positions while the wheel-rim is not mounted on the felly portion 7, I have provided for each of said locking bars 15 a pivoted button 23, as shown in Fig. 2, pivotally secured to one of the lugs 18, which button 23 is of thin sheet metal and which may swing into a position crosswise of the locking bar 15 to retain such bar 15 in its locked position between a pair of said lugs 18 in an obvious manner. When a pneumatic tire is thus mounted on the wheel-rim the wheel-rim may be mounted securely on the felly portion 7 by placing the band 9 and its flange 11 in engagement with the flange 8 and thereupon the clamps 13 may be turned into a position which will cause their engagement with the band 10 and its flange 12, after which the bolts 14 are turned tightly to force the clamps 13 against the band 10 and its flange 12, to clamp the band 9 and its flange 11 against the flange 8 that is fastened to the rear side surface of the felly portion 7, thus to secure the wheel-rim on the felly portion 7 in an obvious manner.

It will be observed that when the outer casing is disposed in its normal position of operation between the flanges 11 and 12 of the wheel-rim, then a portion of one edge of the outer casing 19 will cover the telescopic joint between the bands 9 and 10, thus to prevent any water or moisture from gaining access to the interior of said casing 19 through said telescopic joint.

In Fig. 4 I have shown a modified form of lug, as lug 24, which corresponds in function to each of the integrally united lugs 16 of Figs. 1 and 2, which lug 24 is not inlaid within the wheel-rim to be flush with the surface thereof, but which is fastened by screws to the side of the flange 25 of the band 26 which correspond respectively to flange 12 and the band 10 of Figs. 1 and 2.

Manifestly, a larger number of locking bars 15 and a larger number of clamps 13 than I have shown in the drawing may be employed, if desired, more securely to unite parts of my invention, and, obviously, changes may be made in the forms, dimensions and arrangement of parts of my invention without departing from the spirit thereof.

What I claim is:

A wheel rim of the class described which embodies two flanged bands united by a telescopic joint; a plurality of pairs of lugs disposed to project inwardly from the internal side of one of said flanged bands; a plurality of locking bars, each having one of its ends hinged to the other one of said flanged bands and each having its free end portion of greater width to form oppositely disposed integral locking lugs, said locking bars being disposed each to adapt it to be swingingly moved to engage one of its opposite side surfaces with the internal surfaces of both of said flanged bands and to make a locking engagement between its said locking lugs and one of said pairs of lugs, whereby the other of its opposite side surfaces shall be disposed to adapt said locking bar to engage with and rest upon the periphery of a wheel to support said two flanged bands in a concentric position thereon; and a button pivotally associated with one of the lugs of each pair of lugs and adapted to be turned to a position to maintain the adjacent locking bar in its locked position.

In witness whereof, I hereunto subscribe my name this second day of October, A. D. 1915.

JAMES T. RONALD.

Witnesses:
O. JOHNSON,
FRANK WARREN.